United States Patent [19]

Edwards et al.

[11] Patent Number: 4,944,646

[45] Date of Patent: Jul. 31, 1990

[54] HIGHWAY TRANSPORTABLE MATERIAL STORAGE APPARATUS AND FRAME ASSEMBLY THEREFOR

[75] Inventors: M. Earl Edwards, Hixon, Tenn.; James G. May, Rising Fawn, Ga.

[73] Assignee: Astec Industries, Inc., Chattanooga, Tenn.

[21] Appl. No.: 296,491

[22] Filed: Jan. 12, 1989

[51] Int. Cl.$^5$ .............................................. B65G 69/00

[52] U.S. Cl. ...................................... 414/332; 414/21; 414/476; 414/483; 414/919; 280/704

[58] Field of Search ..................... 280/704, 713, 425.2; 414/484, 485, 21, 476, 919, 475, 332, 483

[56] References Cited

U.S. PATENT DOCUMENTS

| | | | |
|---|---|---|---|
| 2,756,881 | 7/1956 | Sims | 414/21 |
| 4,465,420 | 8/1984 | Dillman | 414/919 X |
| 4,619,578 | 10/1986 | Routledge | 414/476 X |
| 4,763,923 | 8/1988 | Raidel | 280/704 |
| 4,775,275 | 10/1988 | Perry | 414/21 |

OTHER PUBLICATIONS

"Height Control Valve", 4 pages, published by Neway Division/Lear Siegler, Inc., 1985.

*Primary Examiner*—Frank E. Werner
*Assistant Examiner*—Keith L. Dixon
*Attorney, Agent, or Firm*—Bell, Seltzer, Park & Gibson

[57] ABSTRACT

A portable self-erecting storage apparatus for asphaltic mix or the like is disclosed, and which comprises a main frame, and three separate wheeled carriages which are mounted in tandem and are concurrently pivotable between a lowered ground engaging position so that the apparatus is highway transportable, and a raised position so that the frame contacts the ground and thus forms the foundation pad for the apparatus during use. The illustrated embodiment includes a secondary frame which supports a storage container, and the secondary frame and the container may be pivoted about an elevated axis between a generally horizontal transport position and a vertical upright or operative position.

11 Claims, 3 Drawing Sheets

HIGHWAY TRANSPORTABLE MATERIAL STORAGE APPARATUS AND FRAME ASSEMBLY THEREFOR

FIELD OF THE INVENTION

The present invention relates to a portable self-erecting storage apparatus for temporarily storing and dispensing materials such as asphaltic mix and the like. Also, the invention relates to a frame assembly such as an apparatus which is characterized by the ability to permit the frame assembly to be lowered into ground engaging contact so as to provide a foundation pad for the material storage apparatus during use thereof.

BACKGROUND OF THE INVENTION

When paving highways with asphaltic mix, it is desirable to locate the storage apparatus for the mix as near as possible to the construction site so that the trucks which carry the mix to the site do not have to travel long distances. To meet this objective, storage apparatus of various configurations have been proposed which are highway transportable, and which permit the apparatus to be moved to the construction site, erected, and used, and then dismantled and moved to a different construction site. Most designs of the described apparatus include a main frame which supports the material container, and a wheeled carriage which permits the apparatus to be transported on a highway. Once the apparatus is at the construction site, a trench is prepared in the ground, and the apparatus is moved so that the wheels enter the trench. As a result, the main frame is lowered into ground engaging contact and so that it thereafter serves as a foundation pad.

A significant problem with the above construction is the fact that during the time the apparatus is in use at a particular site, which may extend for several months, the trenches become filled with dirt and debris around the wheels. As a result, it is extremely difficult to remove the apparatus from its lowered position when the job is completed and it is desired to move the apparatus to a new location.

It is accordingly an object of the present invention to provide a portable storage apparatus of the described type which avoids the above-noted problem associated with the removal of the apparatus from a construction site.

It is a more particular object of the present invention to provide a portable storage apparatus of the described type which incorporates a relatively simple wheel mounting arrangement which permits the main frame to be lowered into ground engaging position without moving the wheels into a trench, and which also permits the main frame to be readily lifted from the ground when it is desired to move the apparatus along the highway to a new construction site.

SUMMARY OF THE PRESENT INVENTION

These and other objects and advantages of the present invention are achieved in the embodiment illustrated herein by the provision of a frame assembly which comprises an elongate main frame having parallel opposite side beams which define a longitudinal direction, and at least one transverse support beam mounted to the main frame and extending transversely with respect to the opposite side beams. The assembly also includes wheeled ground engaging carriage means which includes a pair of longitudinal arms, means pivotally mounting one end of each of the said arms to the main frame for pivotal movement about a horizontal transverse axis, a transverse strut extending transversely between and interconnecting the arms, with the transverse strut being located in generally vertical alignment with the one transverse support beam, an axle extending transversely between and mounted to the other end of each of the arms, road engaging wheels mounted to the opposite ends of the axle, and air bag suspension means disposed between the transverse strut and the one transverse support beam. Air control means is also provided for selectively supplying air to the air bag suspension means so as to pivot the carriage means about the transverse axis to a lowered ground engaging position when the air bag means is filled, and exhausting air from the air bag suspension means and so that the carriage means pivots about the transverse axis to a raised position with respect to the main frame and the main frame is lowered to engage and rest upon the ground.

In a preferred embodiment, the apparatus also includes a secondary frame including a forward end portion and an opposite rear end portion, with the rear end portion being pivotally mounted to the main frame for pivotal movement about an elevated horizontal pivotal axis. Also, a storage container is mounted to the secondary frame and is positioned between the forward and rear opposite end portions, and lifting means in the form of a pair of hydraulic cylinders is mounted between the main frame and the secondary frame for pivoting the secondary frame and the container between a horizontal transport position and an upright or operative position.

BRIEF DESCRIPTION OF THE DRAWINGS

Some of the objects and advantages of the present invention having been stated, others will appear as the description proceeds, when taken in conjunction with the accompanying drawings, in which.

DETAILED DESCRIPTION OF THE PREFERRED EMBODIMENT

Figure 1:
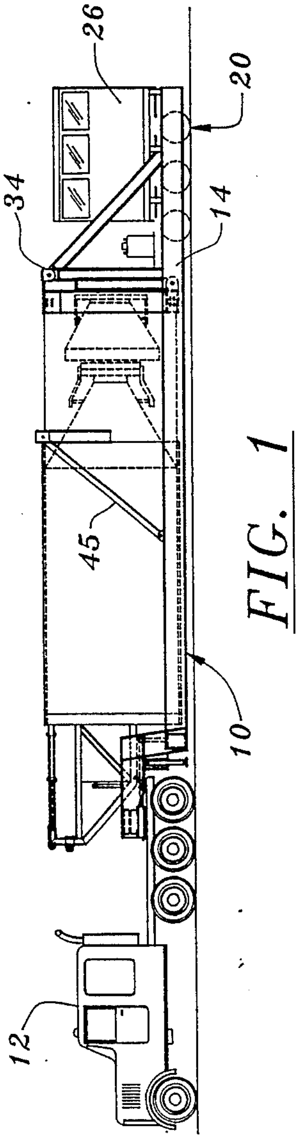
FIG. 1 is a side elevation view of a material storage apparatus which embodies the present invention, shown in its highway transportable configuration.

Referring more particularly to the drawings, a preferred embodiment of a portable self-erecting material storage apparatus in accordance with the present invention is illustrated generally at 10. In FIG. 1, the apparatus 10 is shown being transported along the highway by a conventional tractor 12.

Figure 2:
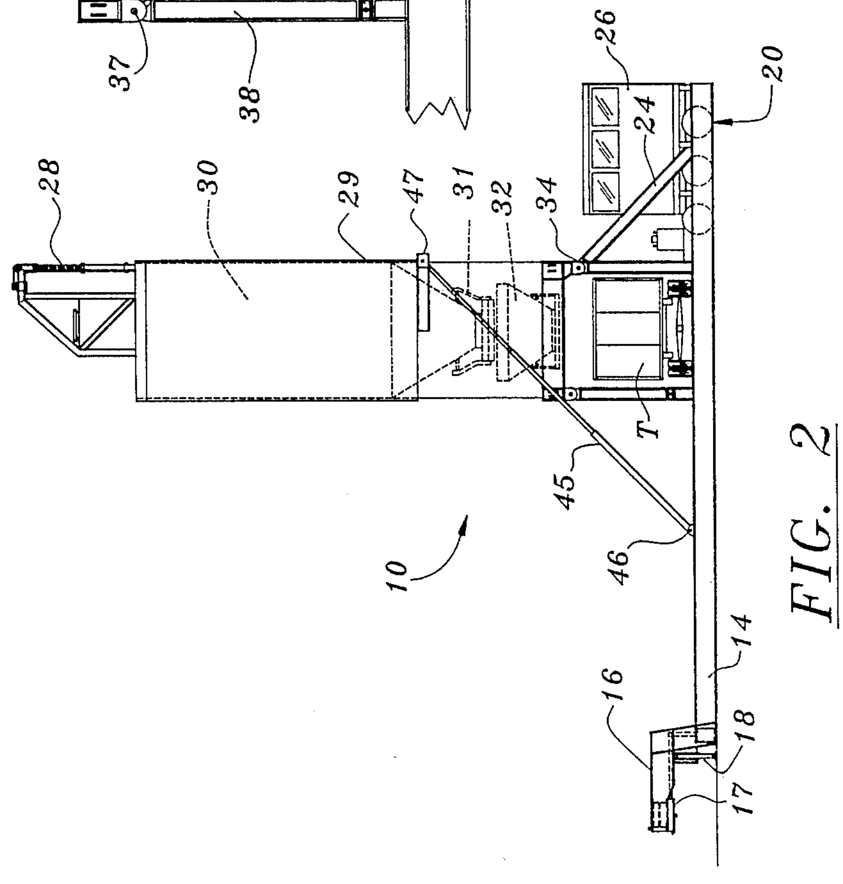
FIG. 2 illustrates the apparatus in its erected or operative position at the construction site.

The illustrated embodiment of the material storage apparatus 10 comprises a main frame composed of two parallel opposite side beams 14, 15 which define a longitudinal direction and which extend along the majority of its length. The left or forward end of the frame as seen in FIGS. 1 and 2 mounts an extension 16 which is positioned somewhat above the level of the side beams, and which in turn mounts a conventional fifth wheel 17 for joining the apparatus to the tractor 12. The extension 16 also mounts a conventional jack 18 for independently supporting the forward end of the frame to facilitate joinder of the fifth wheel to the tractor as well as release of the fifth wheel therefrom. The opposite or rear end portion of the main frame mounts wheeled carriage means 20 by an arrangement which permits the carriage means to be selectively moved vertically between a lowered ground engaging position (note FIGS. 1 and 8) and which permits highway transport of the apparatus, and a raised position wherein the main frame contacts the ground (note FIGS. 2 and 9).

The main frame of the apparatus 10 rigidly mounts a pair of vertical support braces 22, which extend upwardly from respective ones of the side beams 14, 15, and an inclined support brace 24 extending between the upper end of each of the support braces and the associated side beam. Further, a control house 26 is mounted on the main frame above the wheeled carriage means, which houses the various control panels associated with the apparatus.

The main frame of the apparatus 10 also mounts a secondary frame which includes a forward end portion 28 and an opposite rear end portion 29. The secondary frame in turn encloses and supports a mix storage container 30. The container is of conventional design, and includes an open top, lower discharge gate 31, and insulated side walls. Also, a conventional weigh batcher 32 is disposed below the discharge gate.

The rear end portion 29 of the secondary frame is pivotally mounted to the main frame, which permits pivotal movement of the secondary frame with respect to the main frame about an elevated horizontal axis 34 which extends between posts of the upper ends of the vertical support braces 22, and adjacent the joint between each vertical brace 22 and its associated inclined brace 24. Thus the pivotal axis 34 is elevated so as to lie substantially in horizontal alignment with the upper portions of the secondary frame and the container in the horizontal position thereof, and so that the container is elevated in the upright position a distance sufficient to receive a truck T therebelow, note FIG. 2.

The secondary frame also includes a supporting framework 36, which is pivotally mounted for movement about an axis 37 which is parallel to the axis 34. The axis 37 is located adjacent the weigh batcher 32 and on the side thereof opposite the axis 34. The supporting framework 36 comprises a pair of support legs 38, two cross braces 40, and inclined transverse braces 42. The entire framework is initially supported adjacent the weigh batcher, and it is designed to be lowered by a winch (not shown) to a vertical position when the apparatus is erected. The lower ends of the two support legs 38 are then pinned to the main frame at 43, so that the legs then support a portion of the weight of the secondary frame and container.

The forward end portion 28 of the secondary frame includes a framework which is adapted to engage a material conveying apparatus in the manner described in detail in copending and commonly owned application Ser. No. 07/296,492 filed concurrently herewith.

The storage apparatus 10 further comprises lifting means mounted between the main frame and the secondary frame for pivoting the secondary frame and the container between a horizontal transport position (FIG. 1) and an upright position (FIG. 2). In the illustrated embodiment, this lifting means comprises a pair of hydraulic jacks 45, with the two jacks being aligned on opposite sides of the apparatus. More particularly, each jack 45 is pivotally attached to one of the side beams at 46, and is pivotally attached to the secondary frame at 47.

Figure 5:
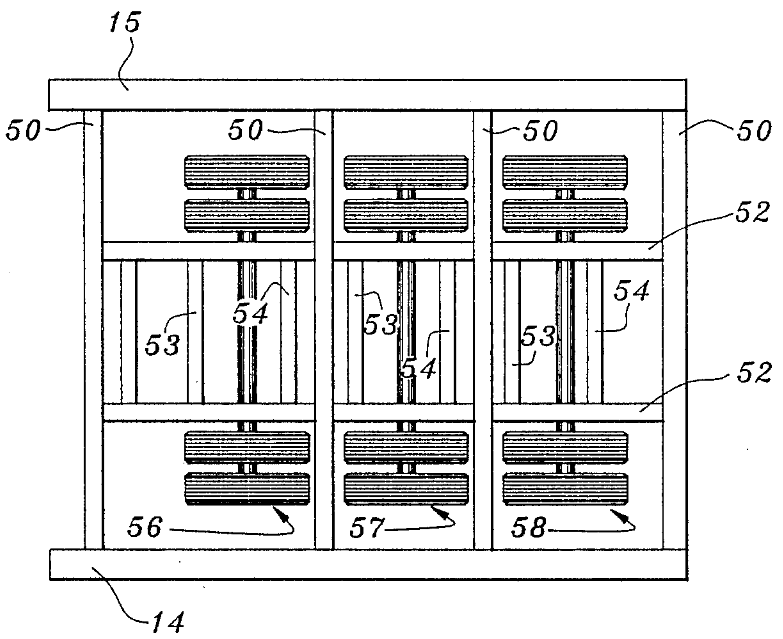
FIG. 5 is a top plan view of the wheeled ground engaging carriage means of the apparatus.
Figure 6:
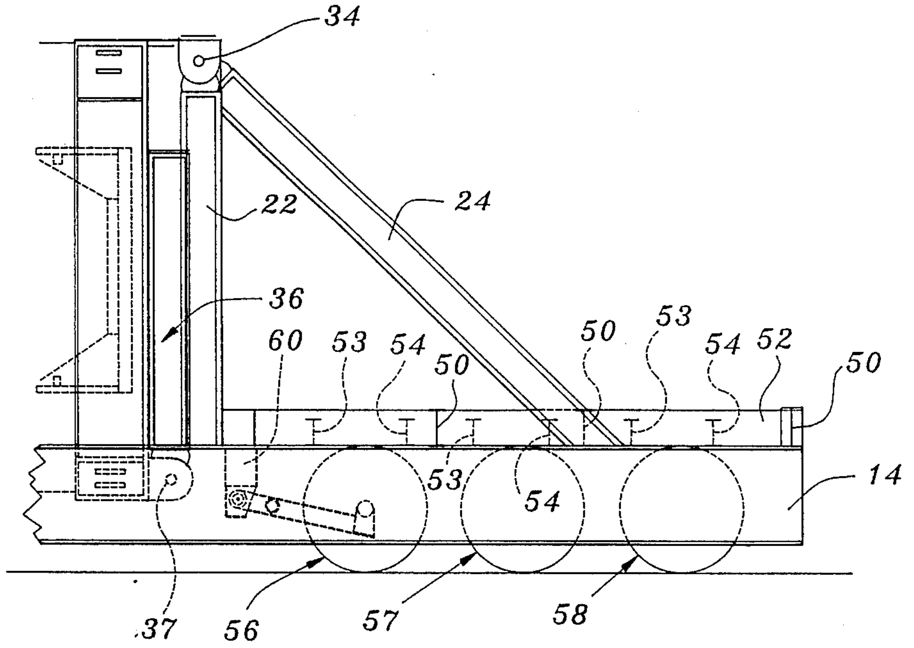
FIG. 6 is a side elevation view of the carriage means shown in FIG. 5.
Figure 7:
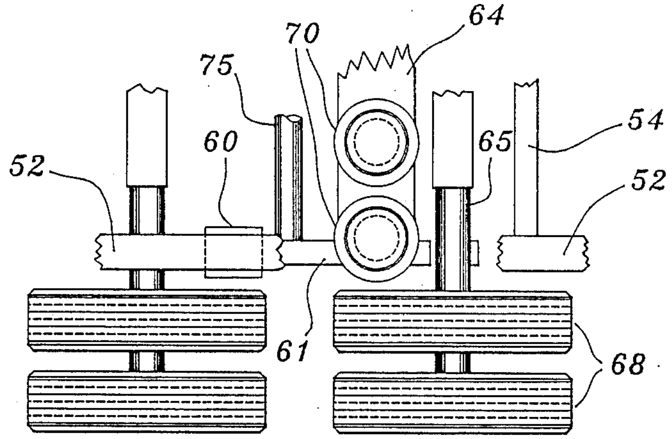
FIG. 7 is a fragmentary enlarged plan view of a portion of the wheeled carriage means.

As best seen in FIGS. 5 and 6, the apparatus 10 further comprises a supporting gridwork mounted to the main frame at the rear end portion thereof and which supports the control house 26 thereupon. The gridwork comprises four transverse beams 50 extending transversely between the opposite side beams 14, 15, and a pair of longitudinal beams 52 positioned parallel to and between the side beams. Also, first and second transverse support beams 53, 54 extend between the longitudinal beams 52 in each of the three central rectangular areas defined between the transverse beams 50 and the two longitudinal beams 52.

In the illustrated embodiment, the wheeled carriage means 20 comprises three separate wheeled carriages 56, 57, 58 which are mounted in tandem to the supporting gridwork. Each wheeled carriage comprises a pair of depending mounting posts 60 (FIGS. 8 and 9) which are mounted to respective ones of the longitudinal beams 52 of the gridwork. Also, each carriage includes a pair of aligned longitudinal arms 61, which are pivotally mounted at one end to respective ones of the posts 60 for pivotal movement about a common horizontal transverse axis 62. The two arms 61 are thereby disposed vertically below and longitudinally aligned with respective ones of the longitudinal beams 52 of the gridwork. A transverse strut 64 extends transversely between and interconnects the two arms 61, and the transverse strut 64 of each carriage is located generally below one of the first transverse support beams 53. An axle 65 extends transversely between the other end of each of the arms 61, and is fixedly mounted thereto by means of a saddle 66. Also, road engaging double wheels 68 are mounted to opposite ends of the axle and so as to lie in the outer open areas defined between the side beams 14, 15, transverse beams 50, and longitudinal beams 52.

Each of the three carriages further comprises an air bag suspension system which is disposed between the transverse strut 64 and the associated transverse support beam 53. As illustrated, the air bag suspension system comprises a plurality of four separate air bags 70 which are mounted in transverse alignment with each other and so as to be generally equally spaced apart from each other in the transverse direction. The air bags are of conventional design and each includes a metal piston 71 mounted to the strut 64 and a flexible, air-tight bellows 72 mounted between the piston 71 and the support beam 53. Also, each carriage preferably includes a pair of shock absorbers 74 mounted between the axle 65 and the second transverse beam 54. Further, a reinforcing post 75 extends transversely between the two arms 61 of each carriage and is located between the transverse axis 62 and the transverse strut 64.

Figure 8:
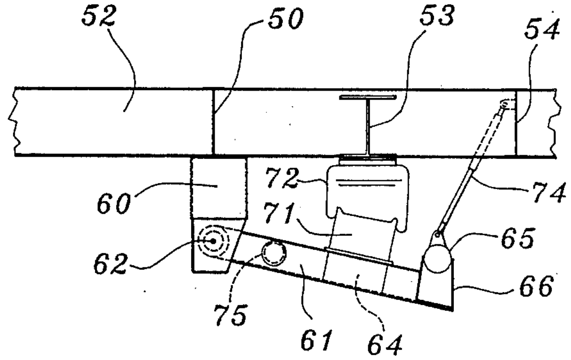
FIGS. 8 and 9 are fragmentary side elevation views of one of the wheeled carriage means of the present invention, and illustrating the same in the lowered highway transportable configuration and the raised position respectively.
Figure 9:
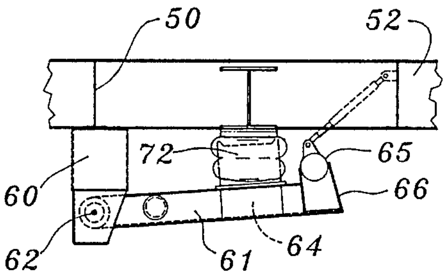
Figure 10:
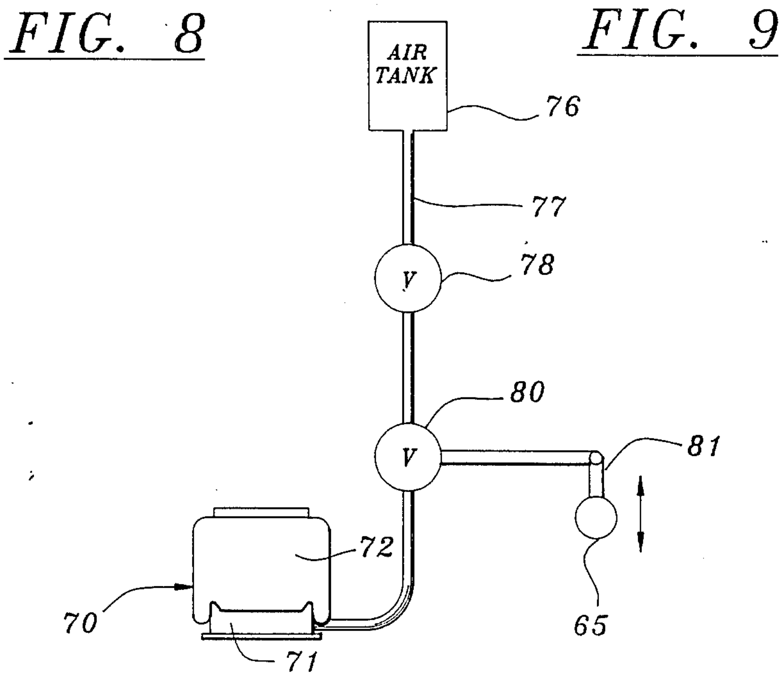
FIG. 10 is a schematic diagram of the air control system for the present invention.

The apparatus 10 of the present invention further includes an air control system as best seen in FIG. 10, for selectively and concurrently supplying air to all of the air bags 70 of each of the carriages. As will be apparent, supplying air to the air bags acts to pivot each carriage about the axis 62 to a lowered ground engaging position as seen in FIG. 8. Exhausting air from the suspension system causes the carriages to pivot about the axis 62 and lift to a raised position with respect to the main frame and such that the main frame is lowered by gravity to engage and rest upon the ground, note FIG. 9. The air control system preferably comprises an air tank 76 which may for example comprise the same air tank in the tractor 12 which is used to supply air pressure for the brakes. A line 77 leads from the air tank to a pressure responsive safety valve 78, which acts to close the line 71 in the event a predetermined minimum pressure is present. Also, there is provided a ride height control valve 80 for each carriage which is mounted to the main frame and connected by a linkage 81 to the axle 65. The valve 80 is thus able to automatically meter air to and from the air bags to maintain a constant ride height, when the carriages are in their road engaging or lowered position. A separate drain valve (not shown) may also be provided for exhausting air from the bags 70.

To effect erection of the apparatus at the construction site, the apparatus is initially brought to the desired location by the tractor 12, and the tractor is then released while the jack 18 supports the weight of the front end portion of the apparatus. Next, the jack 18 is raised to lower the front end portion, and the valve 80 is opened to raise the three wheeled carriages and thereby lower the rear end portion. As a result, the side beams 14, 15 come to rest upon the ground surface and thereafter serve as a foundation pad during use of the apparatus.

Figure 4:
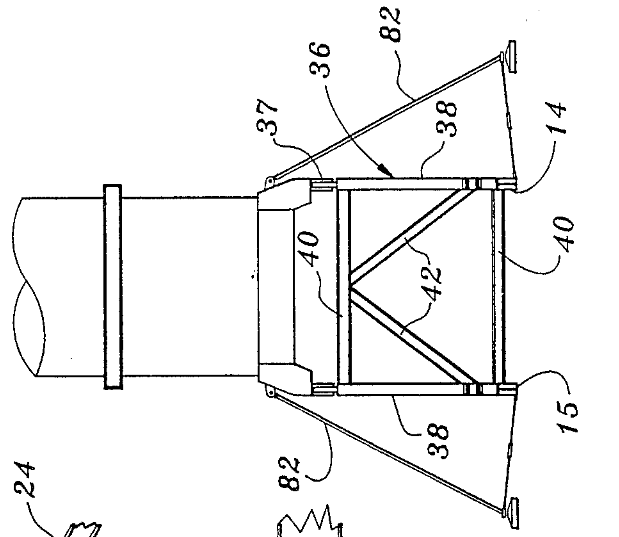
FIG. 4 is a fragmentary front elevation view of the lower portion of the material storage apparatus and also illustrating the reinforcing outriggers.
Figure 3:
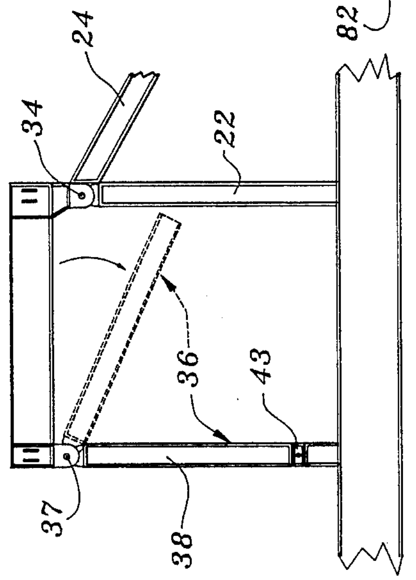
FIG. 3 is a fragmentary side elevation view of the lower portion of the material storage apparatus and illustrating the pivotal support leg.

To complete the erection process, the two hydraulic jacks 45 are extended, which causes the secondary frame of the storage assembly to pivot about the elevated axis 34, and until the elevated position as shown in FIG. 2 is reached. Upon reaching the elevated position, the supporting framework 36 is lowered by a winch (not shown) from its storage position so as to extend vertically between the secondary frame and the main frame. The two support legs 38 of the supporting framework are then pinned to the main frame at 43 so as to partially support the weight of the secondary frame and the container. Thus the pair of vertical braces 22 and the two support legs 38 define an open space therebetween, note FIGS. 2 and 3. As a final step, a pair of outriggers 82 are extended laterally as seen in FIG. 4 to provide improved lateral support for the apparatus.

It will also be seen that the erected or elevated location of the axis 34 results in the secondary frame and the container being elevated a distance sufficient to permit a dump truck T to be driven therebelow. In this regard, the area between the side beams 14, 15 of the main frame below the erected container may be filled with gravel or the like to permit the truck to be driven through the opening defined between the vertical braces and the support legs and as shown in FIG. 2.

In use, the hot asphaltic mix is delivered by a truck from a production plant, and an elevator (not shown) of the type disclosed in the above-referenced copending application Ser. No. 07/296,492 lifts the hot mix and discharges it into the insulated storage container. When desired, a predetermined amount of the hot mix is discharged into the weigh batcher and then discharged into an awaiting truck T.

In the drawings and specification, there has been set forth a preferred embodiment of the invention, and although specific terms are employed, they are used in a generic and descriptive sense only and not for purposes of limitation.

That which is claimed is:

1. A frame assembly for a highway transportable material storage apparatus or the like, and which is characterized by the ability to permit the frame assembly to be lowered into ground engaging contact so as to provide a foundation pad for the material storage apparatus during use thereof, said frame assembly comprising an elongate main frame including a pair of parallel opposite side beams which define a longitudinal direction and front and rear end portions of said frame assembly, a supporting gridwork mounted to said main frame at said rear end portion thereof and comprising a plurality of longitudinally spaced apart transverse beams extending transversely between said opposite side beams, a pair of longitudinal beams positioned parallel to said side beams and extending between a pair of said transverse beams and so that said side beams and said pair of transverse beams define a rectangular opening which is divided by said longitudinal beams into a central area and opposite outer areas, said gridwork further comprising at least one support beam extending transversely between said pair of longitudinal beams, wheeled ground engaging carriage means including a pair of longitudinal arms, means pivotally mounting one end of each of said arms to respective ones of said longitudinal beams for pivotal movement about a common horizontal transverse axis, a transverse strut extending transversely between and interconnecting said arms, with said transverse strut being located generally below said one transverse support beam and at a medial location along the length of said longitudinal arms, an axle extending transversely between and mounted to the other end of each of said arms, a pair of road engaging wheel assemblies mounted to respective opposite ends of said axle and such that each wheel assembly is positioned within a respective one of said opposite outer areas of said rectangular opening, and air bag suspension means disposed between said transverse strut and said one transverse support beam, and air control means for selectively supplying air to said air bag suspension means so as to pivot said carriage means about said transverse axis to a lower ground engaging position when said air bag suspension means is filled, and exhausting air from said air bag suspension means and so that said carriage means pivots about said transverse axis to a raised position with respect to said main frame and said main frame is lowered to engage and rest upon the ground.

2. The frame assembly as defined in claim 1 further comprising shock absorber means mounted between said axle and said main frame.

3. The frame assembly as defined in claim 2 wherein said carriage means further comprises a reinforcing post extending transversely between said arms and located between said transverse axis and said transverse strut.

4. The frame assembly as defined in claim 1 wherein said air bag suspension means comprises a plurality of separate air bags mounted in transverse alignment with each other and generally equally spaced apart from each other in the transverse direction.

5. The frame assembly as defined in claim 1 wherein said frame assembly includes at least one additional transverse support beam mounted to said main frame and longitudinally spaced from said initial transverse support beam, and wherein at least one additional carriage means of a construction corresponding to said initially described carriage means is mounted to said main frame at a location so as to cooperate with said additional transverse support beam, and wherein said air control means is operatively connected to the air bag suspension means of each of said carriage means.

6. The frame assembly as defined in claim 1 further comprises a fifth wheel mounted at said front end portion of said main frame for connecting the same to a highway tractor, and a supporting jack mounted to said main frame adjacent said fifth wheel for elevating the front end portion of said main frame to facilitate joinder of said fifth wheel to a highway tractor and release of said fifth wheel therefrom.

7. A portable self-erecting material storage apparatus for temporarily storing and dispensing a material such as asphaltic mix and the like and comprising an elongate main frame including a pair of parallel opposite side beams which define a longitudinal direction, at least one transverse support beam mounted to said main frame and extending transversely with respect to said opposite side beams, a secondary frame including a forward end portion and an opposite rear end portion, with said rear end portion being pivotally mounted to said main frame for pivotal movement about a horizontal pivotal axis, and a storage container mounted to said secondary frame and positioned between said forward and rear opposite end portions, and such that said secondary frame and said container may be pivoted about said pivotal axis between a generally horizontal position and a vertical upright position, and lifting means mounted between said main frame and said secondary frame for pivoting said secondary frame and said container between said horizontal position and said upright position, wheeled ground engaging carriage means including a pair of longitudinal arms, means pivotally mounting one end of each of said arms to said main frame for pivotal movement about a common horizontal transverse axis, a transverse strut extending transversely between and interconnecting said arms, with said transverse strut being located in general vertical alignment with said one transverse support beam, an axle extending transversely between and mounted to the other end of each of said arms, road engaging wheels mounted to the opposite ends of said axle, and air bag suspension means disposed between said transverse strut and said one transverse support beam, and air control means for selectively supplying air to said air bag suspension means so a to pivot said carriage means about said common transverse axis to a lowered ground engaging position when said air bag suspension means is filled, and exhausting air from said air bag suspension means and so that said carriage means pivots about said common transverse axis to a raised position with respect to said main frame and said main frame is lowered to engage and rest upon the ground, said air control means including means for controlling the amount of air in said air bag suspension means in response to the elevation of said axle with respect to said main frame when said carriage means is lowered to said ground engaging position to thereby maintain a predetermined ride height of said main frame above the highway during highway transport of said frame assembly.

8. The portable self-erecting material storage apparatus as defined in claim 7 wherein said pivotal axis between said main frame and said secondary frame is elevated so as to lie substantially in horizontal alignment with the upper portions of said secondary frame and said container in said horizontal position thereof, and so that said container is elevated in said upright position a distance sufficient to receive a truck therebelow.

9. The portable self-erecting material storage apparatus as defined in claim 8 wherein said secondary frame includes a supporting framework pivotally mounted thereto and which is positioned to extend vertically between said secondary frame and said main frame when said secondary frame is in said upright position and so as to partially support the weight of said secondary frame and said container.

10. The portable self-erecting material storage apparatus as defined in claim 9 wherein said main frame includes a pair of vertical support braces, and wherein said rear end portion of said secondary framework is pivotally mounted to said main frame at the upper extremities of said vertical support braces and such that said horizontal pivotal axis is located to extend across the upper extremity of each of said vertical support braces, and wherein said vertical support braces are located opposite from said supporting framework when said supporting framework is pivoted to its vertical position.

11. The portable self-erecting storage apparatus as defined in claim 10 wherein said container includes weigh batch means for receiving a selected quantity of material, and discharge gate means for selectively discharging material from said weigh batch means into an underlying truck when said container is in said upright position.

* * * * *